(12) United States Patent
Hato et al.

(10) Patent No.: US 8,064,299 B2
(45) Date of Patent: Nov. 22, 2011

(54) OPTICAL PICK-UP

(75) Inventors: Jun Hato, Fujisawa (JP); Akio Yabe, Fujisawa (JP); Kazuhiro Todori, Yokohama (JP); Daisuke Tomita, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 12/856,734

(22) Filed: Aug. 16, 2010

(65) Prior Publication Data

US 2011/0216641 A1 Sep. 8, 2011

(30) Foreign Application Priority Data

Mar. 2, 2010 (JP) ................................. 2010-045529

(51) Int. Cl.
G11B 7/00 (2006.01)

(52) U.S. Cl. ............... 369/44.14; 369/44.11; 369/44.15; 369/44.16

(58) Field of Classification Search ............... 369/44.11, 369/44.14, 44.15, 44.16, 244.1, 112.01, 112.23, 369/112.24; 257/798; 720/638
See application file for complete search history.

(56) References Cited

U.S. PATENT DOCUMENTS

| | | | | |
|---|---|---|---|---|
| 5,319,624 A * | 6/1994 | Yamasaki et al. | ........... | 369/44.14 |
| 5,555,228 A * | 9/1996 | Izuka | ........................... | 369/44.15 |
| 6,084,834 A * | 7/2000 | Kawano et al. | ............... | 369/44.14 |
| 6,288,984 B1 * | 9/2001 | Kawano et al. | ............... | 369/44.14 |
| 6,341,104 B1 * | 1/2002 | Yamaguchi et al. | ........ | 369/44.15 |
| 6,625,091 B2 * | 9/2003 | Obara | ........................ | 369/44.14 |
| 6,906,430 B2 * | 6/2005 | Suzuki et al. | .................. | 257/798 |
| 7,082,084 B2 * | 7/2006 | Kabasawa | .................. | 369/44.16 |
| 7,137,133 B2 * | 11/2006 | Suzuki et al. | .................. | 720/683 |
| RE40,928 E * | 10/2009 | Kawano et al. | ............. | 369/44.14 |
| 7,755,985 B2 * | 7/2010 | Aso et al. | .................... | 369/44.11 |
| 7,813,235 B2 * | 10/2010 | Horinouchi et al. | ........ | 369/44.37 |
| 2001/0038581 A1 * | 11/2001 | Kawano et al. | ............. | 369/44.16 |
| 2003/0067848 A1 * | 4/2003 | Kabasawa et al. | ........ | 369/44.16 |
| 2004/0013079 A1 * | 1/2004 | Suzuki et al. | ................. | 369/244 |
| 2004/0017764 A1 * | 1/2004 | Suzuki et al. | ................. | 369/244 |
| 2005/0007906 A1 * | 1/2005 | Horinouchi et al. | ........ | 369/44.37 |
| 2006/0077780 A1 * | 4/2006 | Yamada et al. | ............. | 369/44.14 |
| 2007/0091739 A1 * | 4/2007 | Aso et al. | .................... | 369/44.15 |
| 2007/0147217 A1 * | 6/2007 | Haruguchi et al. | ....... | 369/112.01 |
| 2009/0103420 A1 * | 4/2009 | Miyata | ..................... | 369/112.23 |
| 2010/0315936 A1 * | 12/2010 | Horinouchi et al. | ..... | 369/112.24 |

FOREIGN PATENT DOCUMENTS

| | | |
|---|---|---|
| JP | 2004-281018 | 10/2004 |
| JP | 2006-260688 | 9/2006 |

* cited by examiner

*Primary Examiner* — Thuy Pardo
(74) *Attorney, Agent, or Firm* — Antonelli, Terry, Stout & Kraus, LLP.

(57) ABSTRACT

In an optical pick-up used in common with DVD/CD and BD, when the thickness is intended to be reduced by mounting a total reflection mirror, a cavity for passing through a laser light is necessary and, since this decreases the degree of freedom for arranging tracking coils and magnets and secondary resonance caused by a magnetic thrust in the tracking direction tends to be generated, an improvement therefor is necessary. In a lens coil holder of the optical pick-up having an objective lens and tracking coil mounted thereon each of the coils is arranged such that the thrust relative to the vertical center of the suspension wires that support the lens coil holder is well balanced. For example, most of the portion of the tracking coils is situated at one height relative to the suspension wire and the tilt coil is situated at the other remaining height.

4 Claims, 12 Drawing Sheets

OPTICAL PICK-UP

INCORPORATION BY REFERENCE

This application relates to and claims priority from Japanese Patent Application No. 2010-045529 filed on Mar. 2, 2010, the entire disclosure of which is incorporated herein by reference.

BACKGROUND OF THE INVENTION (1) Field of the Invention

The present invention concerns an optical pick-up used for an optical disc unit and it particularly relates to an optical pick-up with reduced secondary resonance.

(2) Description of the Related Art

For coping with a recent demand for the reduction of thickness in the field of optical disc units, the reduction in thickness has been progressed also in an optical pick-up for recording and generating information signals by the irradiation of a laser light to an optical disc. For reducing the thickness of the optical pick-up, it is important to decrease secondary resonance upon movement of a lens coil holder in which an objective lens and a driving coil are mounted. The secondary resonance is a large factor of making the recording and reproducing operation instable.

In view of the above, Japanese Patent Application Laid-Open No. 2004-281018 discloses an optical pick-up device in which a first coil is arranged to one side and a second coil is arranged to the other remaining side relative to four wires that support the lens holder.

SUMMARY OF THE INVENTION

In most recent optical pick-ups with reduced thickness, a laser light generated by a laser light source at first propagates substantially in parallel to the surface of an optical disc is totally reflected by a total reflection mirror in an optical pick-up, and irradiated by way of an objective lens in perpendicular to the optical disc. On the other hand, in a case of not using the total reflection mirror, the laser light generated by a laser light source provided just below the objective lens propagates straight as it is and is irradiated from the objective lens to the optical disc. Since this increases the thickness of the optical pick-up, it is not desired for reducing the thickness.

When the total reflection mirror is used, a cavity for passing through the laser light is necessary for a magnet holder that generates DC magnetic fields and the lens coil holder in the optical pick-up.

On the other hand, BD (Blue-ray Disc) has been popularized at present and, accompanying thereto, optical pick-ups having two constituent elements for BD and DVD (Digital Versatile Disc)/CD (Compact Disc) have been adopted more and more. In the optical pick-up used for this purpose, it is necessary for objective lens, the laser light source, and total reflection mirror each by two, as well as it is necessary to extend the width of the cavity of the magnet holder and the lens coil holder for passing through the laser light. Actually, one surface of the holders is almost occupied by the cavity as far as a predetermined height. Therefore, the degree of freedom is decreased for arranging magnets and coils including the tracking coils on the surface of the holder, and, particularly, arrangement itself is difficult at a height substantially identical with that of the cavity. For example, it is difficult to arrange the magnets and the coils as shown in FIG. 4 of the Japanese Patent Application Laid-Open No. 2004-281018 and there is a subject of providing a new method of arrangement for reducing the secondary resonance.

In view of the subject described above, the present invention intends to provide an optical pick-up for reducing the secondary resonance.

The subject described above can be solved in accordance with the first aspect of present invention by an optical pick-up of an optical disc unit of irradiating a laser light to an optical disc thereby recording and reproducing information signals including;

a plurality of laser light sources each generating a laser light in the direction of a linear velocity parallel to the disc surface of the optical disc, a plurality of total reflection mirrors each irradiated with a laser light generated by each of the plurality of laser light sources and reflecting the light in a direction perpendicular to the disc surface of the optical disc, and an objective lens driving device having a plurality of objective lenses each supplied with each of the laser lights reflected by each of the plurality of total reflection mirrors and irradiates the laser light to the optical disc in which the objective lens driving device includes:

a plurality of objective lenses for condensing the laser light to the optical disc, first and second tracking coils that supply varying magnetic fields for controlling the radial position of the objective lens to the surface of the optical disc, a focusing coil that supplies the varying magnetic fields for controlling the position of the objective lens perpendicular to the surface of the optical disc, a lens coil holder in which the plurality of objective lenses are mounted being juxtaposed in the radial direction of the optical disc on the surface opposing to the optical disc, and the first and second tracking coils are mounted on the lateral surface parallel to the radial direction of the optical disc, and having a focusing coil at the periphery thereof, first and second magnet groups which are arranged in the radial direction to the optical disc and generate DC magnetic fields for driving the lens coil holder in the radial direction to the surface of the optical disc and in the direction perpendicular to the surface of the optical disc, and suspension wires which are provided in the direction of the linear velocity parallel to the surface of the optical disc for supplying control signals to the first and the second tracking coils and the focusing coil thereby generating the varying magnetic fields and supporting the lens coil holder, in which the lens coil holder has a cavity extending in the radial direction of the optical disc for irradiating the laser light to the total reflection mirror, the first tracking coil is situated on the lateral surface of the lens coil holder above the cavity and the second tracking coil is situated on the lateral surface of the lens coil holder opposite to that of the first tracking coil with reference to the total reflection mirror interposed therebetween, and the first tracking coil and the second tracking coil are situated at different heights with reference to the vertical center of the suspension wires interposed therebetween.

Further the present invention provides, in a second aspect, an optical pick-up of an optical disc unit of irradiating a laser light to an optical disc thereby recording and reproducing information signals including;

a plurality of laser light sources each generating a laser light in the direction of a linear velocity parallel to the disc surface of the optical disc, a plurality of total reflection mirrors each irradiated with a laser light generated by each of the plurality of laser light sources and reflecting the light in a direction perpendicular to the disc surface of the optical disc, and an objective lens driving device having a plurality of objective lenses each supplied with each of the laser lights reflected by each of the plurality of total reflection mirrors and irradiates the laser light to the optical disc in which the objective lens driving device includes:

a plurality of objective lenses for condensing the laser light to the optical disc, first and second tracking coils that supply varying magnetic fields for controlling the radial position of the objective lens to the surface of the optical disc, a focusing coil that supplies the varying magnetic fields for controlling the position of the objective lens perpendicular to the surface of the optical disc, a tilt coil that supplies varying magnetic fields for controlling the tilting direction of the objective lens to the surface of the optical disc, a lens coil holder in which the plurality of objective lenses are mounted being juxtaposed in the radial direction of the optical disc on the surface opposing to the optical disc, and the first and second tracking coils are mounted on the lateral surface parallel to the radial direction of the optical disc, first and second magnet groups which are arranged in the radial direction of the optical disc and generate DC magnetic fields for driving the lens coil holder in the radial direction to the surface of the optical disc, in the direction perpendicular to the surface of the optical disc, and in the direction tilting to the optical disc, and suspension wires which are provided in the direction of the linear velocity parallel to the surface of the optical disc for supplying control signals to the first and the second tracking coils, the focusing coil, and the tilt coil thereby generating the varying magnetic fields and supporting the lens coil holder, in which the lens coil holder has a cavity extending in the radial direction of the optical disc for irradiating the laser light to the total reflection mirror, and the first tracking coil is situated on the lateral surface of the lens coil holder above the cavity and the second tracking coil is situated on the lateral surface of the lens coil holder opposite to that of the first tracking coil with reference to the total reflection mirror interposed therebetween, the tilt coil is situated on the lateral surface identical with that of the second tracking coil, and most of the portion of the first tracking coil and the second tracking coil are situated at a vertical height with reference to the suspension wires and the tilt coil is situated at the other remaining vertical height with reference to the suspension wires.

Further the present invention provides, in a third aspect, an optical pick-up of an optical disc unit of irradiating a laser light to an optical disc thereby recording and reproducing information signals including;

a plurality of laser light sources each generating a laser light in the direction of a linear velocity parallel to the disc surface of the optical disc, a plurality of total reflection mirrors each irradiated with a laser light generated by each of the plurality of laser light sources and reflecting the light in a direction perpendicular to the disc surface of the optical disc, and an objective lens driving device having a plurality of objective lenses each supplied with each of the laser lights reflected by each of the plurality of total reflection mirrors and irradiates the laser light to the optical disc in which the objective lens driving device includes:

a plurality of objective lenses for condensing the laser light to the optical disc, first and second tracking coils that supply varying magnetic fields for controlling the radial position of the objective lens to the surface of the optical disc, a focusing coil that supplies the varying magnetic fields for controlling the position of the objective lens perpendicular to the surface of the optical disc, a tilt coil that supplies varying magnetic fields for controlling the tilting direction of the objective lens to the surface of the optical disc, a lens coil holder in which the plurality of objective lenses are mounted being juxtaposed in the radial direction of the optical disc on the surface opposing to the optical disc, and the first and second tracking coils are mounted on the lateral surface parallel to the radial direction of the optical disc, first and second magnet groups which are arranged in the radial direction to the optical disc and generate a DC magnetic field for driving the lens coil holder in the radial direction of the surface of the optical disc, in the perpendicular direction to the surface of the optical disc, and in the direction tilting to the optical disc, and suspension wires which are provided in the direction of the linear velocity parallel to the surface of the optical disc for supplying control signals to the first and the second tracking coils, the focusing coil, and the tilt coil thereby generating the varying magnetic fields and supporting the lens coil holder, in which the lens coil holder has a cavity extending in the radial direction of the optical disc for irradiating the laser light to the total reflection mirror, the first tracking coil is situated on the lateral surface of the lens coil holder above the cavity and the second tracking coil is situated on the lateral surface of the lens coil holder on the side opposite to the first tracking coil with reference to the total reflection mirror interposed therebetween, the tilt coil is situated on the lateral surface identical with that of the second tracking coil, the first tracking coil is situated at a height with reference to the suspension wires, the second tracking coil is situated at the other remaining height with reference to the suspension wires, and the center for the height of the tilt coil is situated at the vertical height of the suspension wire.

The present invention can provide an optical pick-up with reduced secondary resonance and provides an effect capable of contributing to the improvement for the base performance of the optical disc unit.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

The present invention is to be described by way of preferred embodiments with reference to the drawings. At first, the entire configuration of an optical pick-up used in an optical disc unit is to be described with reference to FIG. 1.

Figure 1:
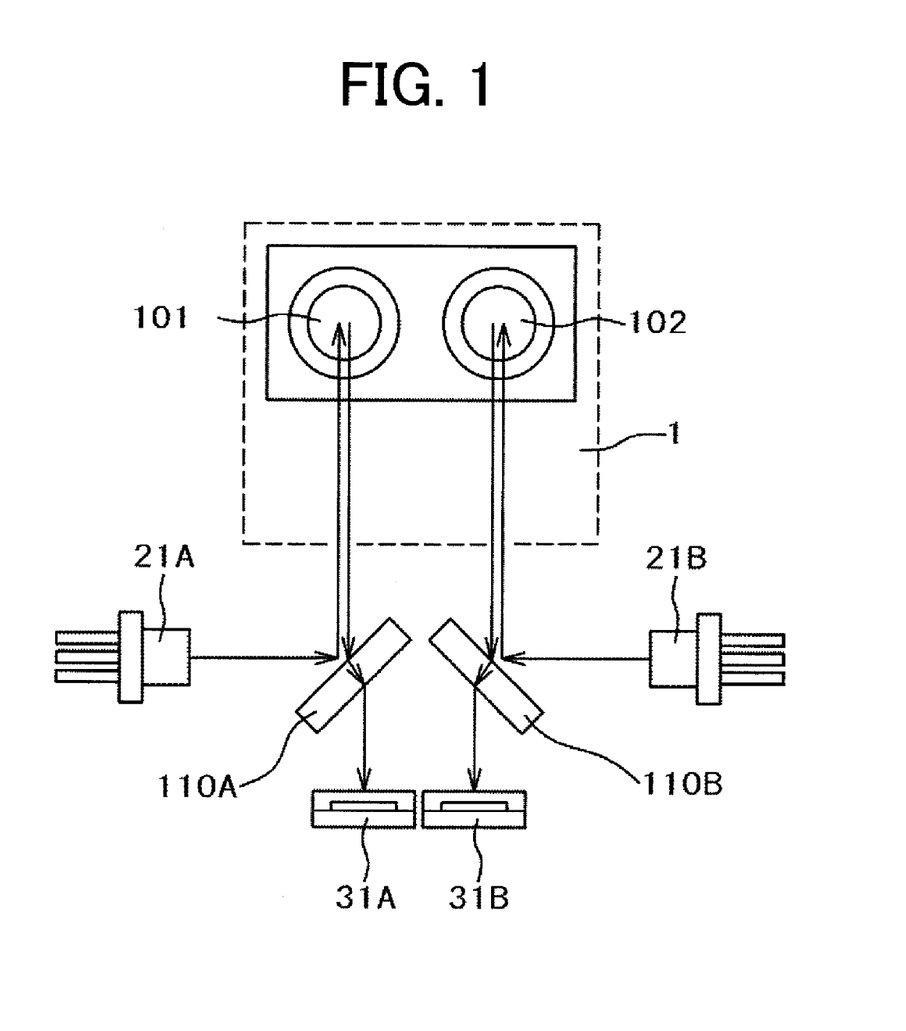
FIG. 1 is a block diagram of an optical pick-up in one embodiment of the present invention.

FIG. 1 is a block diagram of an optical pick-up in one embodiment of the invention. This shows an optical pick-up conforming to both of DVD/CD and BD as described above.

In FIG. 1, the optical pick-up includes, as most basic constituent elements, an objective lens driving device 1, laser light sources 21A and 21B, optical detectors 31A and 31B, and total reflection mirrors 110A, 110B (which may also be a beam splitter conducting both total reflection and transmission as shown in the drawing). While the objective lens driving device 1 includes a number of constituent elements as to be described later, objective lenses 101, 102 are shown herein. An arrow in the drawing shows an optical path of a laser light generated from the laser light sources 21A and 21B.

The laser light source 21A, the total reflection mirror 110A, the objective lens 101, and the optical detector 31A shown in the left-half part of the drawing are constituent elements for DVD/CD, and the remaining elements in the right-half part thereof are constituent elements for BD. For example, a blue laser light generated by the laser light source 21B for BD is totally reflected at the total reflection mirror 110B and reaches the objective lens 102. Further, the light is irradiated to the surface of an optical disc not illustrated and information of the laser light is recorded in the optical disc. Further, a laser light reflected at the surface of the optical disc and condensed by the objective lens 102 reaches the optical detector 31B and information recorded in an optical disc is reproduced in a signal processing circuit in the subsequent stage not illustrated. For a red (infrared) laser light generated by the laser light source 21A for DVD/CD, identical recording/reproducing processing is carried out by using the total reflection mirror 110A, the objective lens 101, and the optical detector 31A.

While an actual optical pick-up has furthermore constituent elements including a collimator lens for collimating a diverging light emitted from the laser light source 21A or 21B into a parallel light, description therefor is to be omitted for avoiding the complexity of the description.

Preferred embodiments of the present invention are to be described with reference to the drawings, while attaching importance to the objective lens driving device 1 among the constituent elements of the optical pick-up shown in FIG. 1.

Embodiment 1

Figure 2:
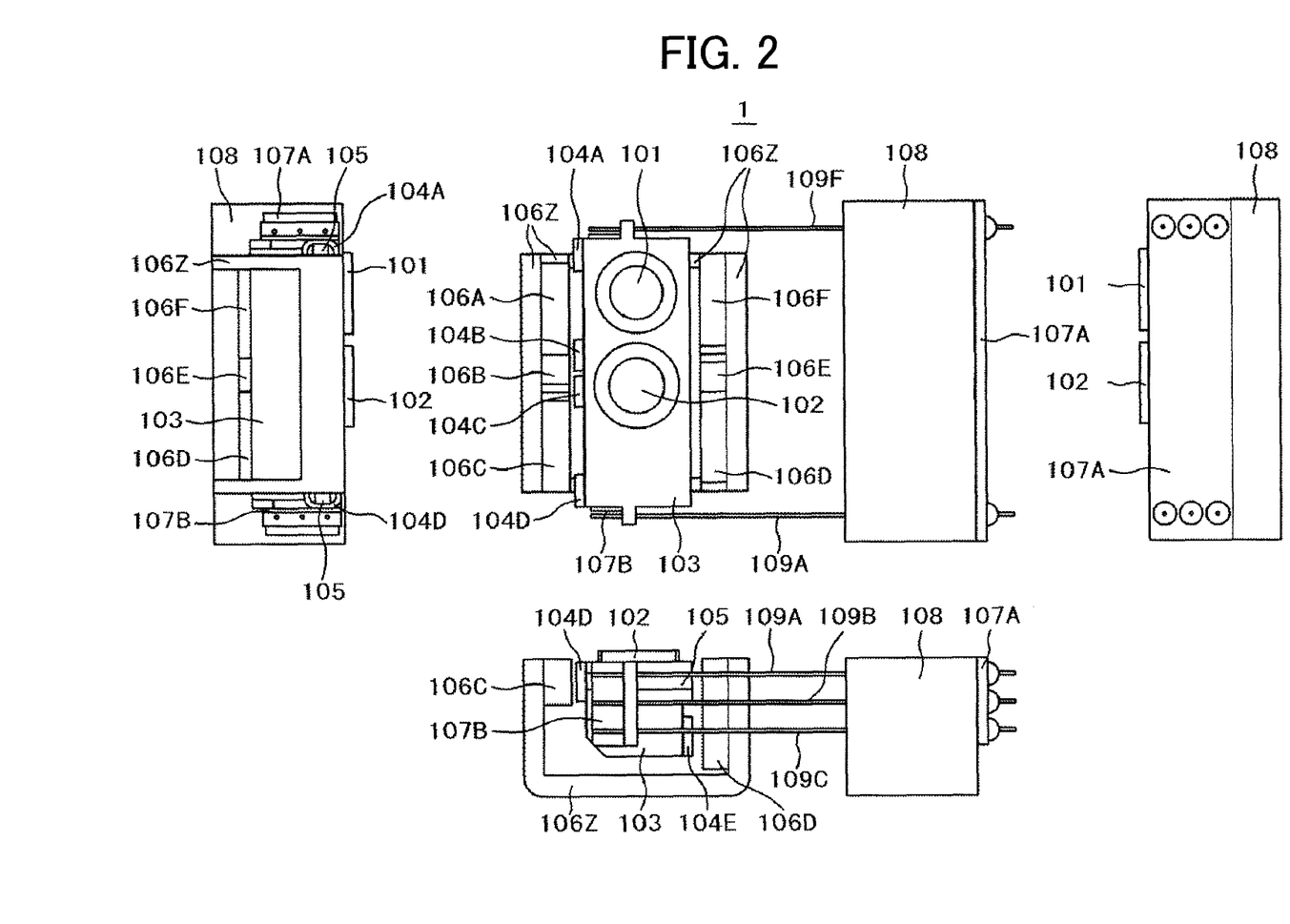
FIG. 2 shows a plan view and a side elevational view of an objective lens driving device in an Embodiment 1.

FIG. 2 shows a plan view and a side elevational view of an objective lens driving device 1 in the Embodiment 1. The plan view is shown in a central portion of the drawing in which the upward/downward direction is a tracking direction as a radial direction of an optical disc, the right to left direction is a tangential direction as a direction of linear velocity, and the direction perpendicular to the drawing sheet is a focusing direction. Side elevational views as viewed from left and right, and from below are also shown together relative to the plan view.

A first objective lens 101 (for example, DVD/CD lens) and a second objective lens 102 (for example, BD lens) are mounted on a lens coil holder 103. The lens coil holder 103 has a function as an actuator of moving the first objective lens 101 and the second objective lens 102 in the tracking direction and the focusing direction. This performs tracking control or focusing control to the recording track of the optical disc.

As is well-known, they are controlled by magnetic fields. Tracking control signals and focusing control signals supplied from a first conductive substrate 107A are sent by way of suspension wires 109A to 109F (while 109D and 109E are not numbered, they are shown in the subsequent drawings) to a second conductive substrate 107B. Then, the tracking control signals are supplied from the second conductive substrate 107B to tracking coils 104A to 104H (while 104F to 104H are not numbered, they are shown in the subsequent drawings). The tracking coils 104A to 104H generate magnetic fields that vary based on the tracking control signals and the lens coil holder 103 having the objective lens 101 and the objective lens 102 mounted thereon controls a laser light passing through the objective lens 101 or 102 such that the light traces the center of the recording track of the optical disc in accordance with the magnetic fields. Further, the focusing control signals are supplied from the second conductive substrate 107B to a focusing coil 105. The focusing coil 105 generates magnetic fields that vary based on focusing control signals, and the lens coil holder 103 in which the objective lens 101 and the objective lens 102 are mounted thereon controls the laser light passing through the objective lens 101 or 102 such that the light is focused at the recording surface of the optical disc in accordance with the magnetic fields.

On the lens coil holder 103, the objective lenses 101 and 102, the tracking coils 104A to 104H, and the focusing coil 105 are mounted. The suspension wires 109A to 109F have a function of transmitting the control signals described above, as well as have a function of resiliently supporting the lens coil holder 103 by way of the first conductive substrate 107A to a damping holder 108.

While the illustrated embodiment has six magnets, eight tracking coils, one focusing coil, and six suspension wires, this is only an example and the embodiment includes also other cases where the numbers of the elements are different.

Then, an optical path of the laser light reaching the second objective lens 102 is to be described.

Figure 3:
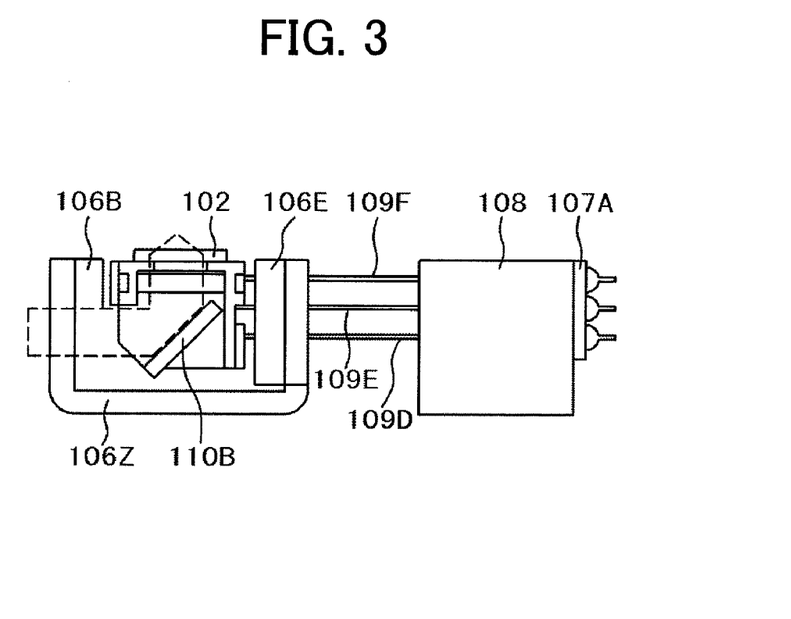
FIG. 3 is a cross sectional view of an objective lens driving device in the Embodiment 1.

FIG. 3 is a cross sectional view of the objective lens driving device 1 in the Embodiment 1, which is a cross sectional view of the objective lens 102 sectioned in the right-to-left direction in FIG. 1 at the center. It will be apparent that a similar cross sectional view is obtained also in a case of cross section with respect to the center of the objective lens 101.

In FIG. 3, a portion surrounded by a broken line shows an optical path of a laser light. A laser light generated from a laser light source (not illustrated) is incident from the left of the drawing to the total reflection mirror 110B and reflected totally toward the objective lens 102 in the upward direction of the drawing. As described above, the configuration shown in FIG. 3 is effective for reducing the thickness of the optical pick-up. In a case where a plurality of objective lenses are used as in this embodiment, a large cavity for passing through the laser light is necessary in the direction of the depth in FIG. 3.

This is shown more specifically also including the size of an actual cavity with reference to FIG. 4 to FIG. 8.

Figure 4:
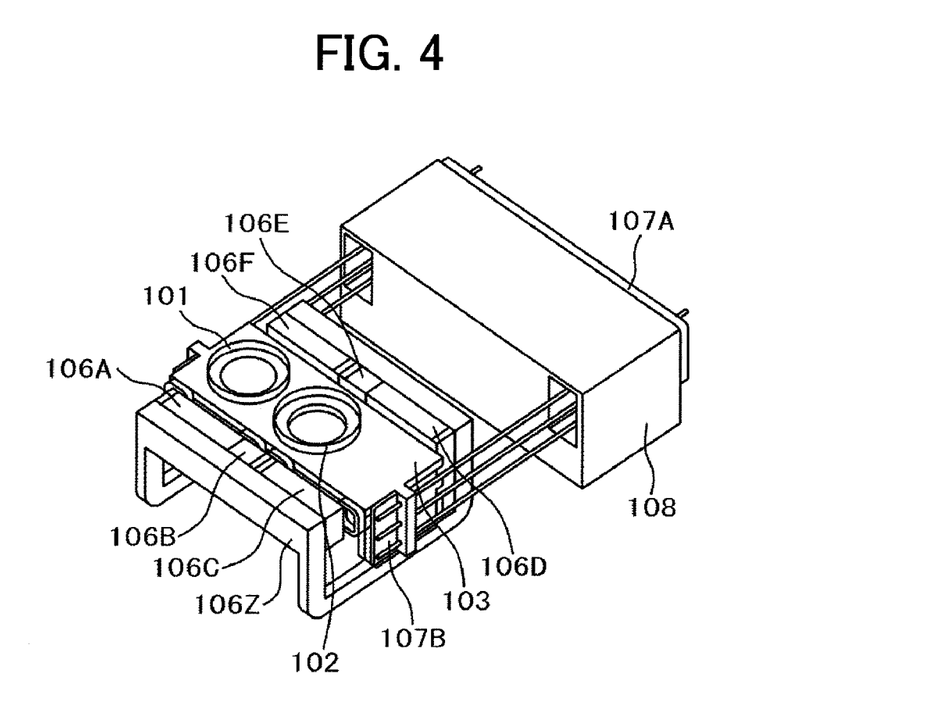
FIG. 4 is an exterior view of an objective lens driving device in the Embodiment 1.

FIG. 4 is an exterior view of the objective lens driving device 1 in the Embodiment 1, which is drawn from an obliquely leftward direction relative to the plan view in the central part of FIG. 2. In a magnet holder 106Z in which a plurality of magnets 106A to 106F are mounted thereon, a large cavity is provided for passing through the laser light on the left near side of the drawing. It is difficult to arrange the magnets at least on both sides of the cavity.

Figure 5:
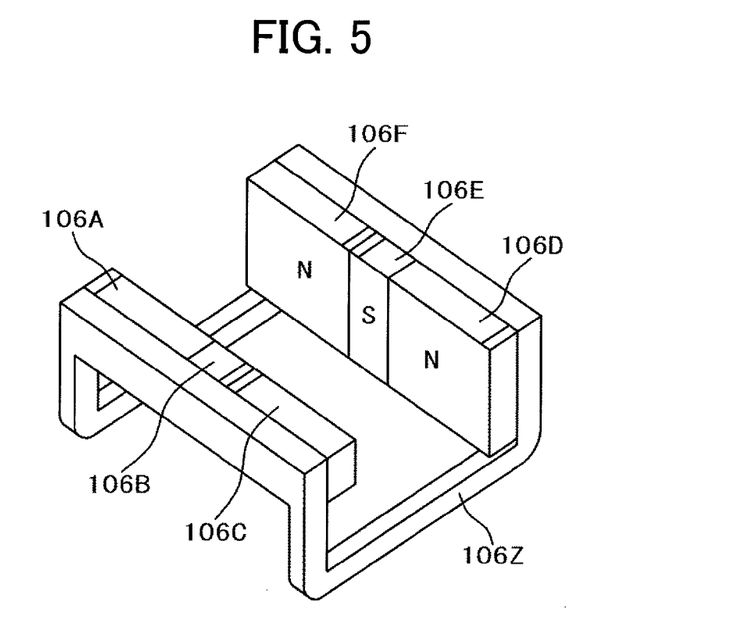
FIG. 5 is an exterior view of a magnet holder in the Embodiment 1.
Figure 6:
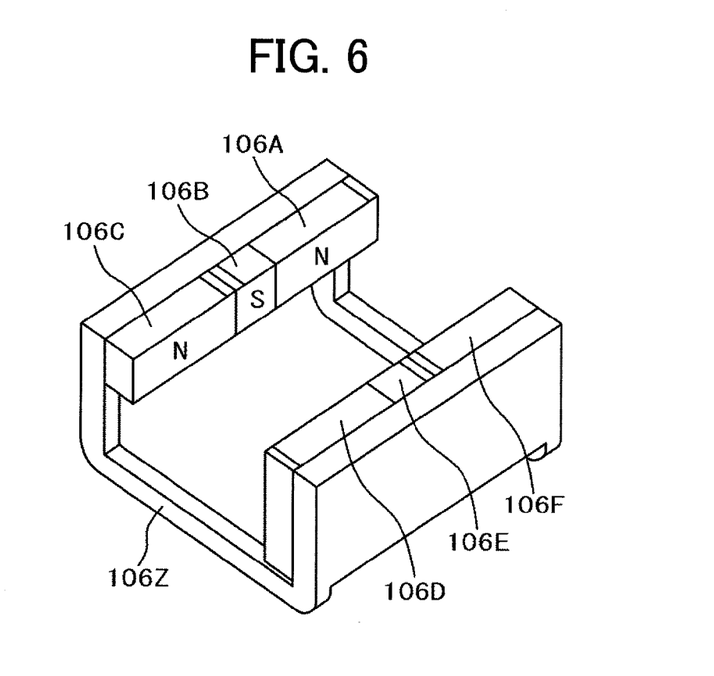
FIG. 6 is another exterior view of a magnet holder in the Embodiment 1.

FIG. 5 is an exterior view of a magnet holder 106Z in the Embodiment 1, which is drawn in the direction identical with that of FIG. 4. FIG. 6 is another exterior view of the magnet holder 106Z in the embodiment 1, which is drawn from the right of FIG. 5. In the magnet holder 106Z, the magnets 106A to 106F are mounted for supplying DC magnetic fields to the lens coil holder 103 in which the objective lenses 101 and 102 are mounted thereon. As previously shown with reference to FIG. 3, the total reflection mirror 110E is provided between the magnets 106A to 106C and the magnets 106D to 106F opposed to each other. Then, the magnets 106A to 106C situated on the incident side of the laser light are situated above the cavity for passing through the incident laser light. The magnets 106D to 106F situated at the position opposing to them are provided by utilizing the frontal side for the incident laser light, that is, substantially the entire surface at the back of the total reflection mirror.

Figure 7:
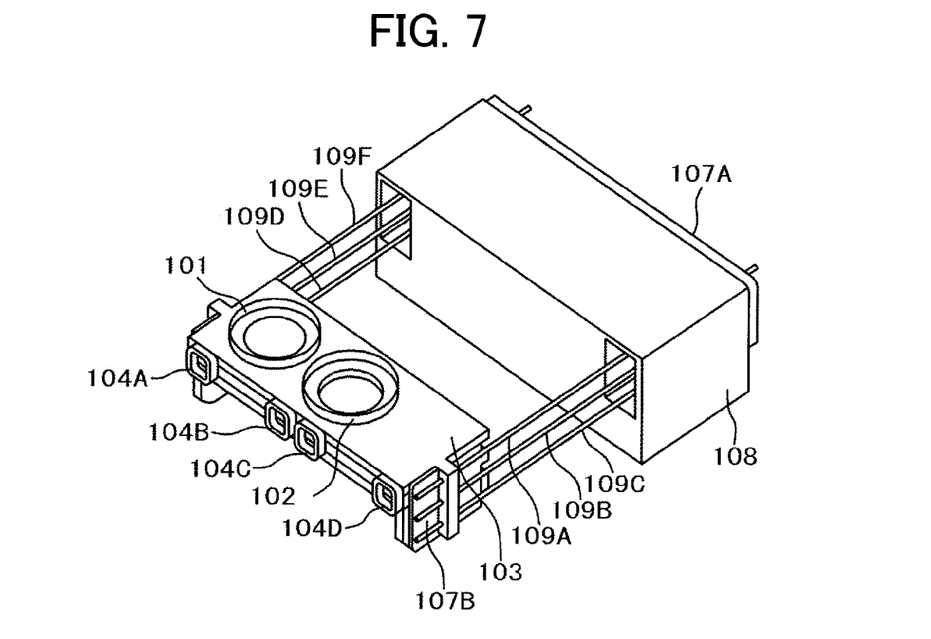
FIG. 7 is an exterior view at the periphery of a lens coil holder in the Embodiment 1.
Figure 8:
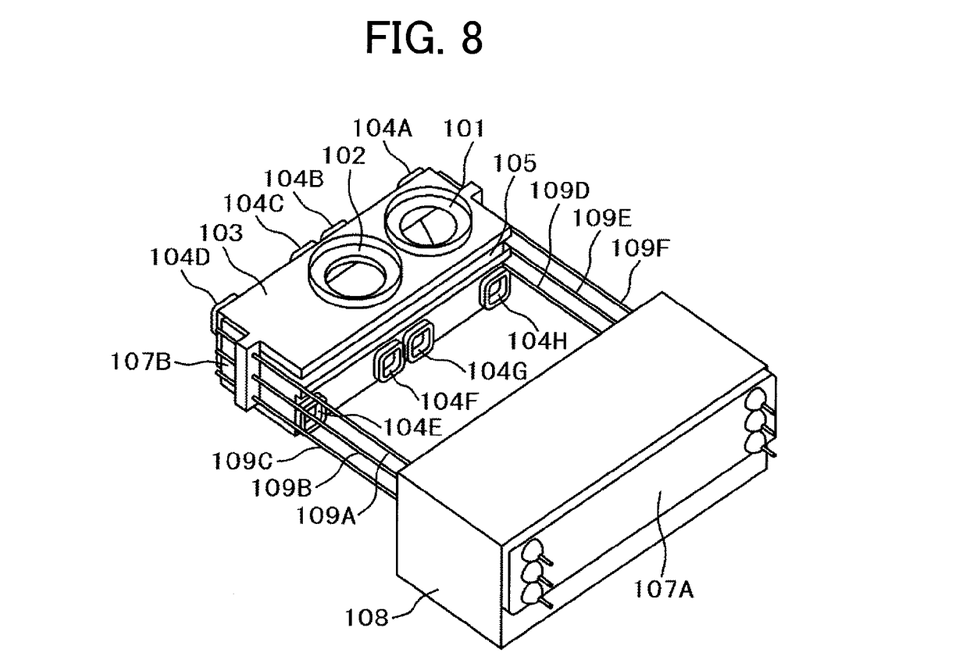
FIG. 8 is another exterior view at the periphery of the lens coil holder in the Embodiment 1.

FIG. 7 is an exterior view at the periphery of the lens coil holder 103 in the Embodiment 1, which is drawn in a state of removing the magnets 106A to 106F and the magnet holder 106Z in comparison with FIG. 4. FIG. 8 is another exterior view at the periphery of the lens coil holder 103 in the Embodiment 1, which is drawn from the right of FIG. 7. In the lens coil holder 103 in which the tracking coils 104A to 104H are mounted thereon, a large cavity for passing through the laser light is provided on the left near side of FIG. 7. It is difficult to arrange the tracking coils at least on both sides of the cavity. Then, the tracking coils 104A to 104D provided on the incident side of the laser light are situated above the cavity for passing through the incident laser light. The tracking coils 104E to 104H at the position opposing to them are provided on the frontal side for the incident laser light, that is, at the back of the total reflection mirror.

Then, description is to be made to a method of arranging the tracking coils 104A to 104H for reducing the secondary resonance in this embodiment.

The secondary resonance that results in a disadvantage in recording and reproducing operation is caused by a thrust generated by magnetic fields induced from the tracking coils 104A to 104H. For example, in a case where the thrust is localized to the upper portion of the lens coil holder 103, since this exerts in the direction of turning down the lens coil holder 103, this results in the secondary resonance.

This embodiment has a feature of defining the arrangement for the tracking coils 104A to 104H so that the thrust does not generate the turning down force in order to decrease the secondary resonance. In FIG. 2 to FIG. 8, a dynamic moment with respect to the vertical center of the suspension wires 109B and 109E situated at the vertical central position of the suspension wires 109A to 109F that support the lens coil holder 103 is taken into consideration. In the lens coil holder 103, the moment of the thrust exerting on the gravitational center for the portion above the suspension wires 109B and 109E relative to the suspension wires 109D to 109E is assumed as A. Further, in the lens coil holder 103, the moment of the thrust exerting on the gravitational center for the portion below the suspension wires 109B and 109E relative to the suspension wires 109B and 109E is assumed as B. When the moment A is equal with the moment B, the turning force is not generated and the secondary resonance can be decreased drastically.

Actually, for the weight of the constitutional elements mounted on the lens coil holder 103, the weight of the tracking coils 104A to 104H has a high proportion. Accordingly, for reducing the secondary resonance, it is an important subject how to situate the tracking coils 104A to 104H relative to the suspension wires 109B and 109E.

As one of features of the Embodiment 1, as shown in FIGS. 2, 4, 7 and 8, the tracking coils 104E to 104H that oppose to the tracking coils 104A to 104D situated above the cavity for the incidence of the laser light and the suspension wires 109B and 109E are situated on the frontal side for the incident laser light, that is, the rear side of the total reflection mirror, that is a position below the suspension wires 109B and 109E. Accordingly, the Embodiment 1 can drastically improve the phenomenon that the secondary resonance is generated by the thrust to result in the disadvantage in the recording and reproducing operation.

The objective lens driving device 1 often has a tilt coil for compensating the tilting of the object lens in addition to the tracking coil and the focusing coil described above. While the tilt coil has not been shown specifically in the drawing, there is a method of mounting the tilt coil below the second objective lens 102 (in view of the drawing) in the lens coil holder 103 in the plan view at the central part of FIG. 2. In this case, the tilt coil is provided in a direction parallel to the focusing coil 105 and in a direction crossing the tracking coils 104A to 104H.

Embodiment 2

Then, an embodiment of the present invention different from the Embodiment 1 is to be described. Descriptions are to be made mainly for the matters different from those of the Embodiment 1 in which constituent elements which may be substantially identical with those of the Embodiment 1 carry same reference numerals, for which detailed descriptions may be sometimes omitted.

Figure 9:
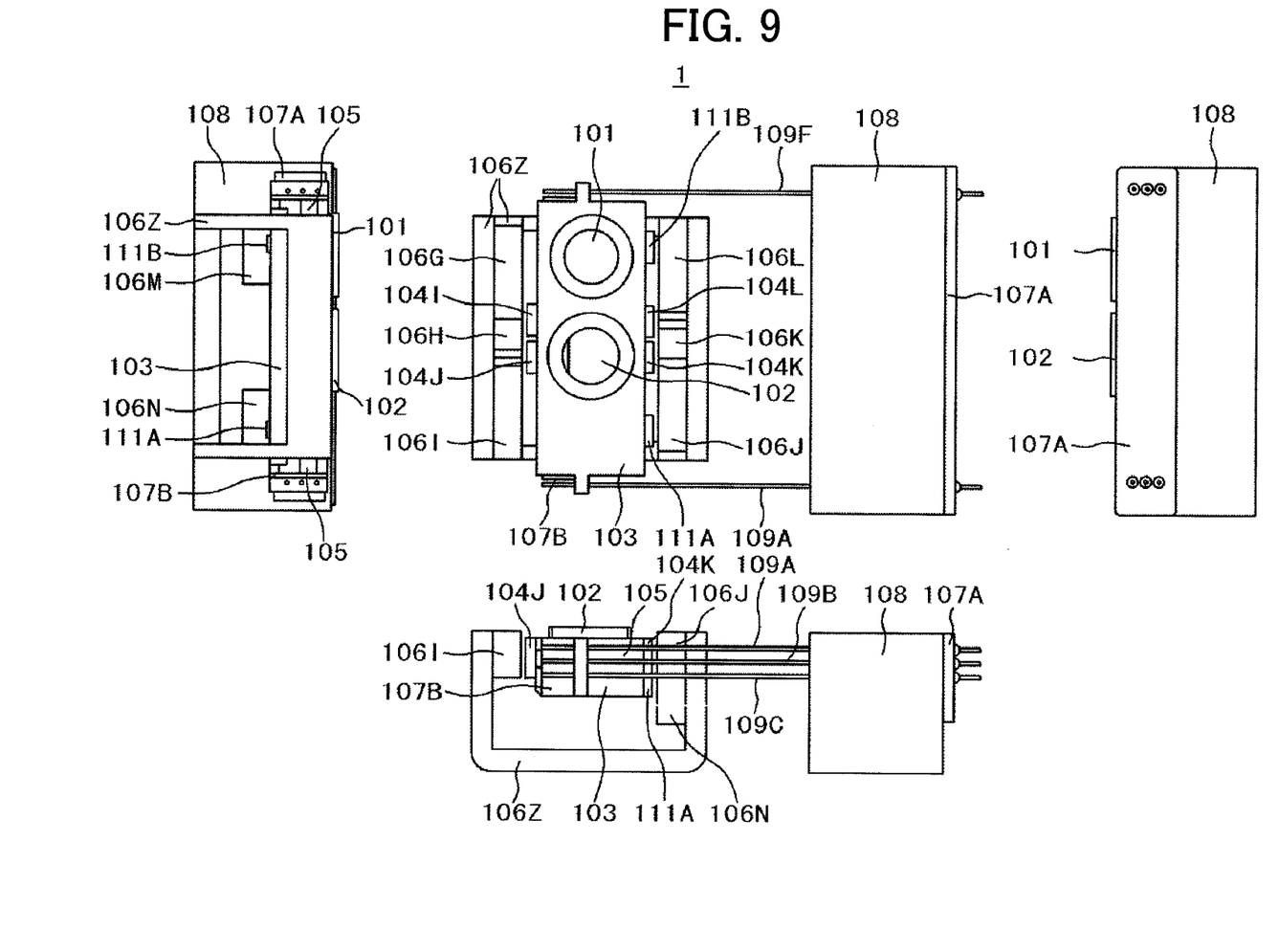
FIG. 9 shows a plan view and a side elevational view of an objective lens driving device in an Embodiment 2.

FIG. 9 shows a plan view and a side elevational view of an objective lens driving device 1 in an Embodiment 2. Different from FIG. 2, four tracking coils 104I to 104L are provided and eight magnets 106G to 106N are provided. Additionally, two tilt coils 111A and 111B are provided. The supporting center for six suspension wires 109A to 109F is shifted upward in comparison with FIG. 2.

Figure 10:
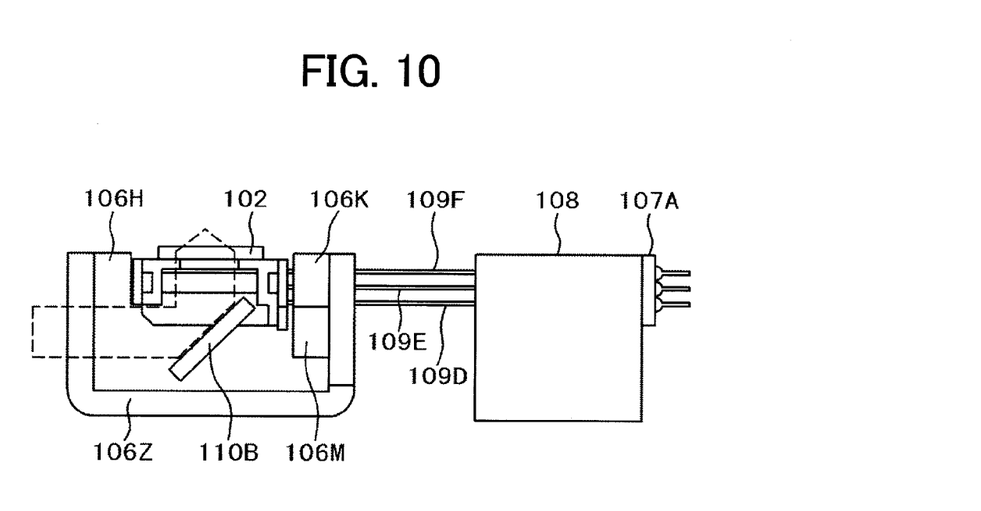
FIG. 10 is a cross sectional view of the objective lens driving device in the Embodiment 2.

FIG. 10 is a cross sectional view of the objective lens driving device 1 in the Embodiment 2, which is drawn by the same manner as that of previous FIG. 3 and in which a broken line shows the optical path of a laser light.

Since a laser light generated by a laser light source (not illustrated) is incident from the left of the drawing to a total reflection mirror 110B and totally reflected upward in the drawing toward an objective lens 102, a large cavity for passing through the laser light is necessary in the direction of the depth in FIG. 10 in a case where a plurality of objective lenses are used as in this embodiment.

Figure 11:
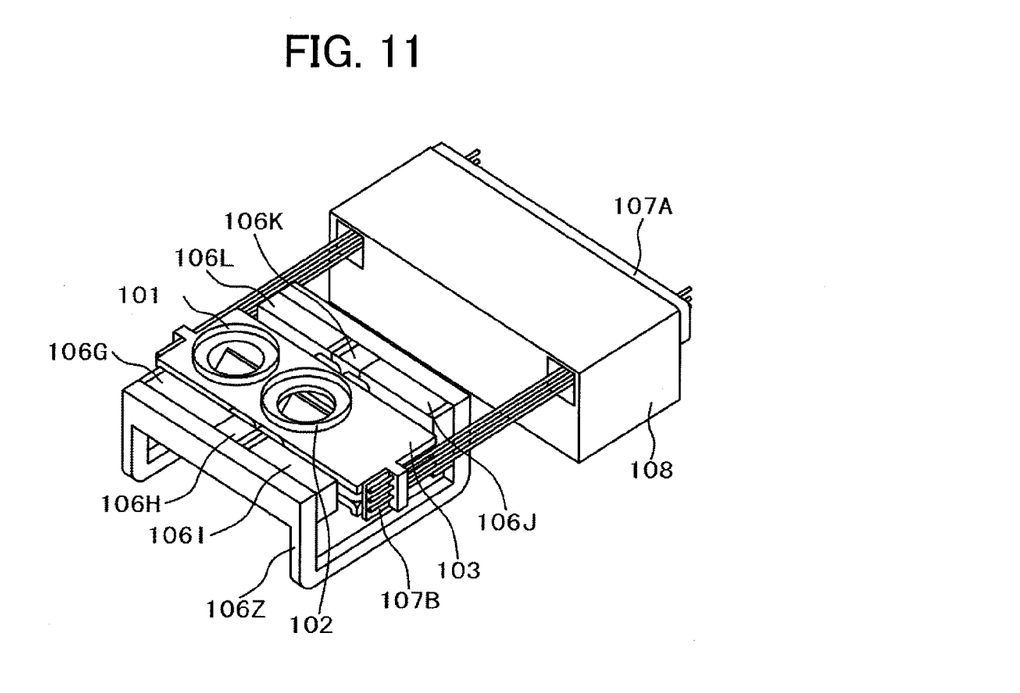
FIG. 11 is an exterior view of the objective lens driving device in the Embodiment 2.

FIG. 11 is an exterior view of the objective lens driving device 1 in the Embodiment 2. This is drawn in the same manner as that of FIG. 4 described above. In the magnet holder 106Z in which magnets 106G to 106N are mounted thereon, a large cavity for passing through the laser light is provided on the left near side of the drawing. It is difficult to arrange the magnets at least on both sides of the cavity.

Figure 12:
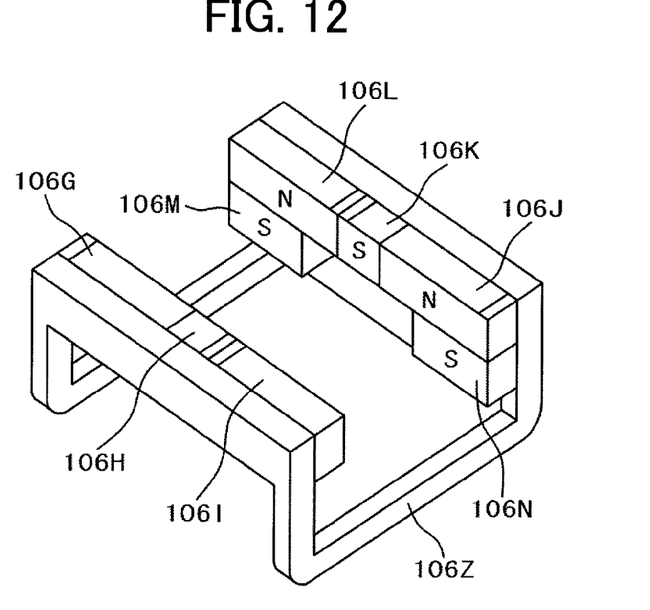
FIG. 12 is an exterior view of a magnet holder in the embodiment 2.
Figure 13:
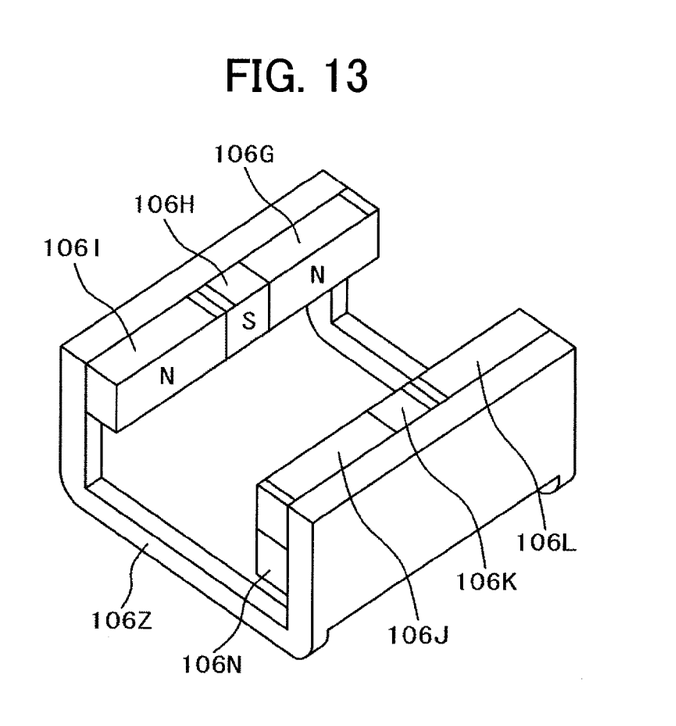
FIG. 13 is another exterior view of the magnet holder in the Embodiment 2.

FIG. 12 is an exterior view of a magnet holder 106Z in the Embodiment 2, which is drawn in the same direction as that in FIG. 11. FIG. 13 is another exterior view of the magnet holder 106Z in the Embodiment 2, which is drawn from the right in FIG. 12. Magnets 106G to 106N for generating DC magnetic fields are mounted on the magnet holder 106Z. As shown in FIG. 10, a total reflection mirror 110B is provided between magnets 106G to 106I and magnets 106J and 106N opposing to each other. Then, the magnets 106G to 106I provided on the incident side of the laser light are situated above the cavity for passing through the incident laser light. The magnets 106J to 106N situated at the position opposing to them are provided by utilizing the frontal side for the incident laser light, that is, the rear side of the total reflection mirror.

Figure 14:
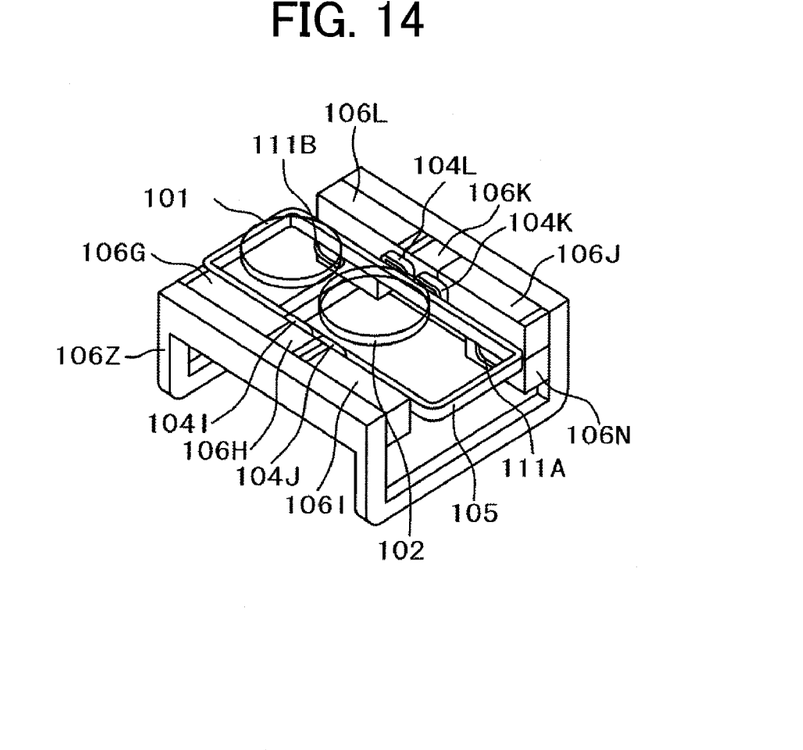
FIG. 14 is an exterior view at the periphery of an objective lens coil holder in the Embodiment 2.

FIG. 14 is an exterior view at the periphery of the objective lens holder in the Embodiment 2, which is drawn so as to clearly show relative positions for objective lenses 101 and 102, tracking coils 104I to 104L, a focusing coil 105, tilt coils 111A and 111B, and the magnets 106G to 106N, for example, by removing lens coil holder 103, etc. In a not illustrated lens coil holder 103, a large cavity for passing through the laser light is provided on the left near side in FIG. 14. It is difficult to arrange the tracking coils at least on both sides of the cavity. Then, the tracking coils 104I and 104J provided on the incident side of the laser light are situated above the cavity for passing through the incident laser light. The tracking coils 104K and 104L are situated at a position opposing to them. The tracking coils 104E to 104H are situated vertically opposite to that of the tracking coils 104A to 104D with respect to the suspension wires 109B and 109E in the previous Embodiment 1, whereas the tracking coils 104K and 104L are at the height close to that of the tracking coils 104I and 104J in the Embodiment 2.

Figure 15:
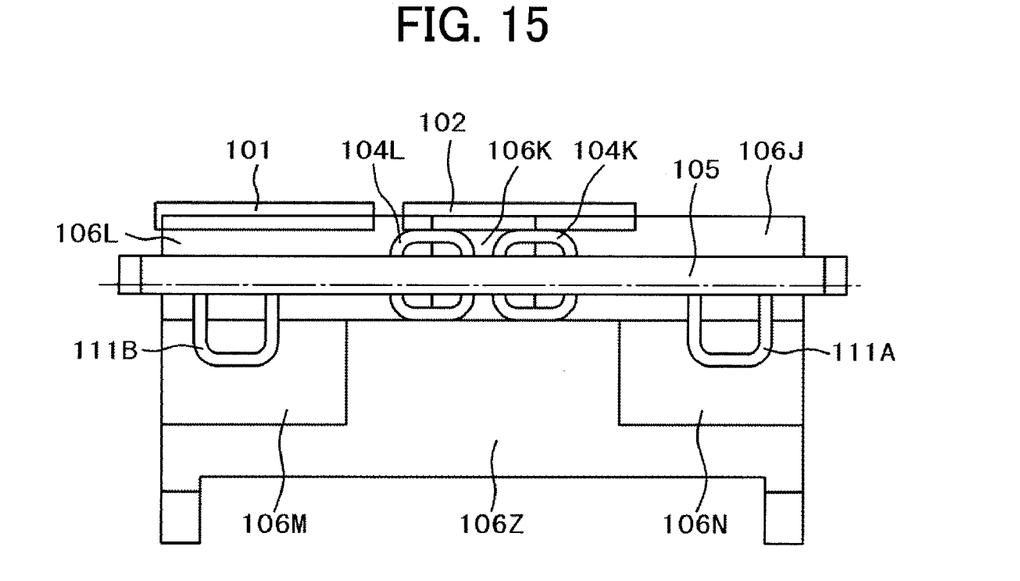
FIG. 15 is a cross sectional view showing the position for each of coils in the Embodiment 2.

FIG. 15 is a cross sectional view showing the position for each of the coils in the Embodiment 2, which is drawn along a cross section passing through the centers of both objective lenses 101 and 102 in FIG. 14. A broken line in the drawing shows the center of the suspension wires 109B and 109E in view of the height.

In FIG. 15, a tilt coil 111A is arranged so as to overlap with both of the magnet 106J and the magnet 106N having a polarity different from that of the magnet 106J each by a substantially identical area. In the same manner, the tilt coil 111B is arranged so as to overlap with both of the magnet 106L and the magnet 106M having a polarity different from that of the magnet 106L each by a substantially identical area. Therefore, since the tilt coils 111A and 111B can generate a thrust in each of the tilting directions of the objective lenses, the purpose can be attained even by small-sized coils. In this embodiment, the magnets 106M and 106N may be saved providing that lowering of the efficiency of the tilt coil results in no substantial problem.

On the other hand, as also shown from the previous side elevational view from below in FIG. 9 described above, while the height for the suspension wires 109B and 109E is at a height of the focusing coil 105 in FIG. 15, it is at a position lower than the center of the focusing coil 105 in view of the height. Therefore, in the tracking coils 104I to 104L, the mass and the thrust are larger for the upper portion than those for the lower portion with reference to the suspension wires 109B and 109E interposed therebetween. On the other hand, the tilt coils 111A and 111B are situated substantially below the suspension wires 109B and 109E. This can substantially equalize the moment of the thrust in the tracking direction generated by the tracking coils 104I to 104L between both portions with reference to the suspension wires 109B and 109E interposed therebetween. Accordingly, the Embodiment 2 can drastically improve the phenomenon that the secondary resonance is generated by the thrust to result in the disadvantage in the recording and reproducing operation.

The Embodiment 2 is different from the Embodiment 1 in that the secondary resonance is decreased while taking the effect of the tilt coils 111A and 111B into consideration.

Also in the Embodiment 2, the numbers for the respective constituent elements shown therein are only an example. While other cases where the numbers of the elements are different may also be considered, each of them is within a range of this embodiment.

Embodiment 3

Then, description is to be made to a further different embodiment of the invention having the features of the Embodiment 1 and the Embodiment 2 together.

Figure 16:
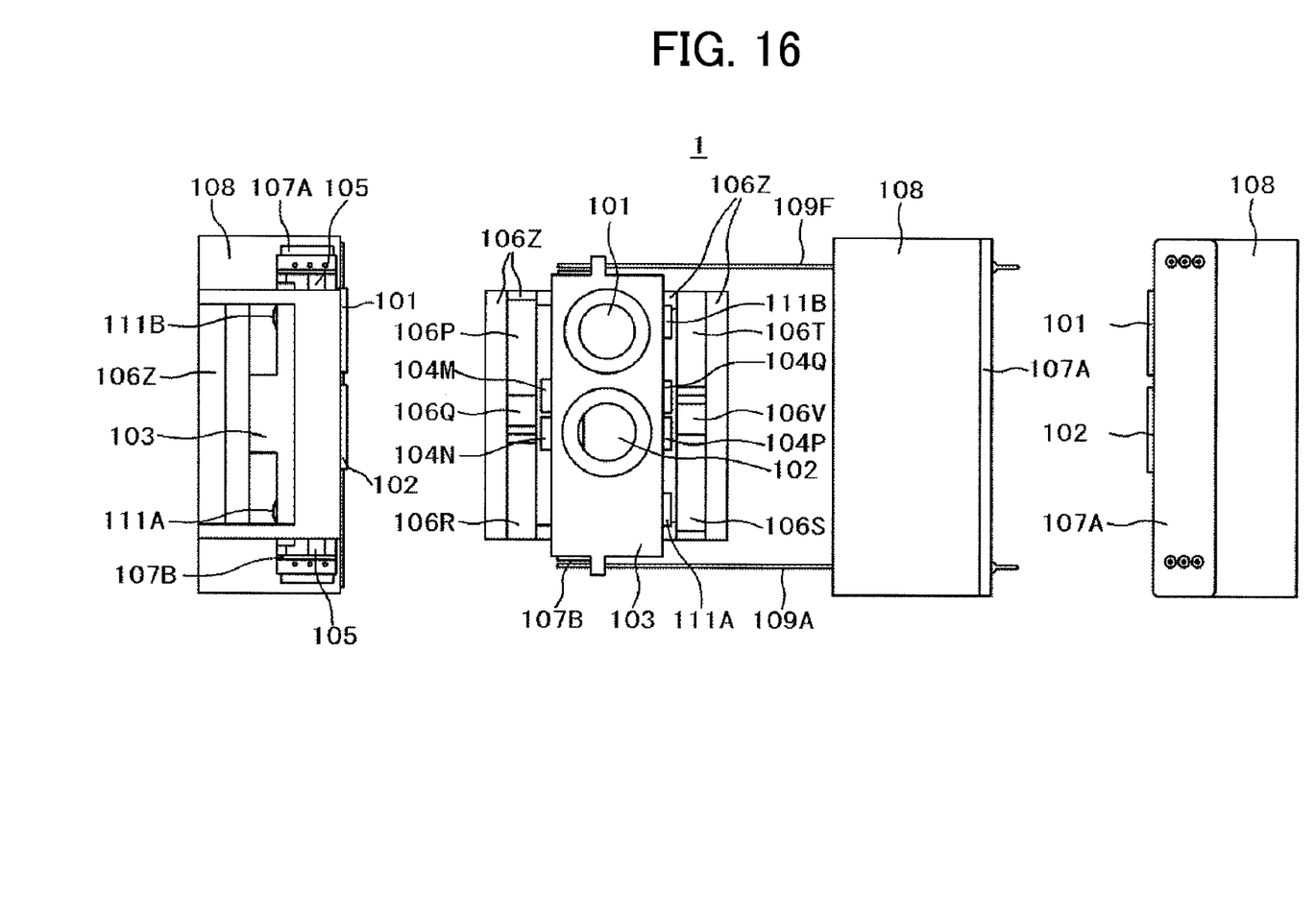
FIG. 16 shows a plan view and a side elevational view of an objective lens driving device in an Embodiment 3.

FIG. 16 shows a plan view and a side elevational view of an objective lens driving device 1 in an Embodiment 3.

Figure 17:
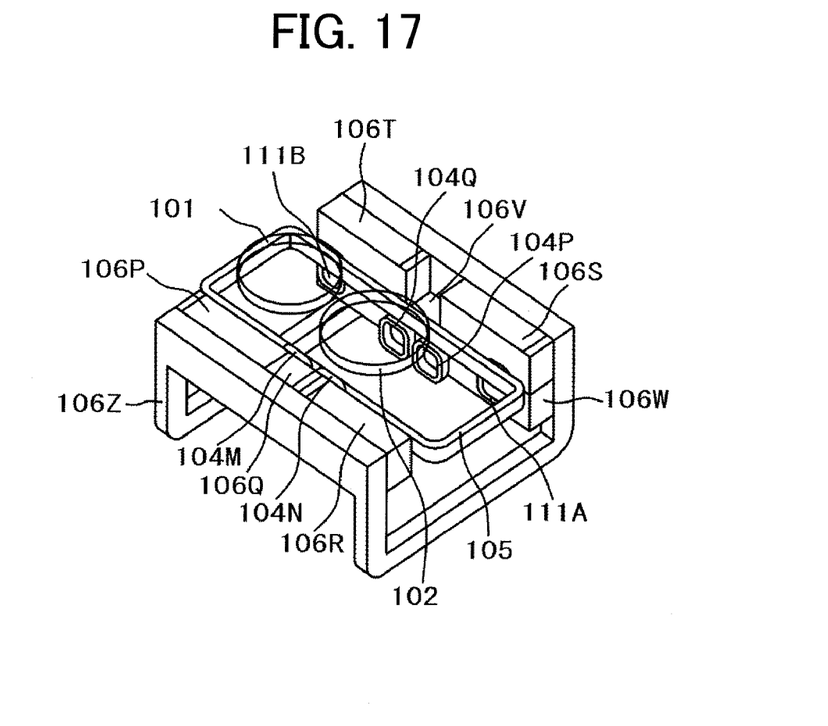
FIG. 17 is an exterior view at the periphery of an objective lens coil holder in the Embodiment 3.

FIG. 17 is an exterior view for the periphery of an objective lens holder in the Embodiment 3, which is drawn in the same manner as that of FIG. 14 of the Embodiment 2.

Figure 18:
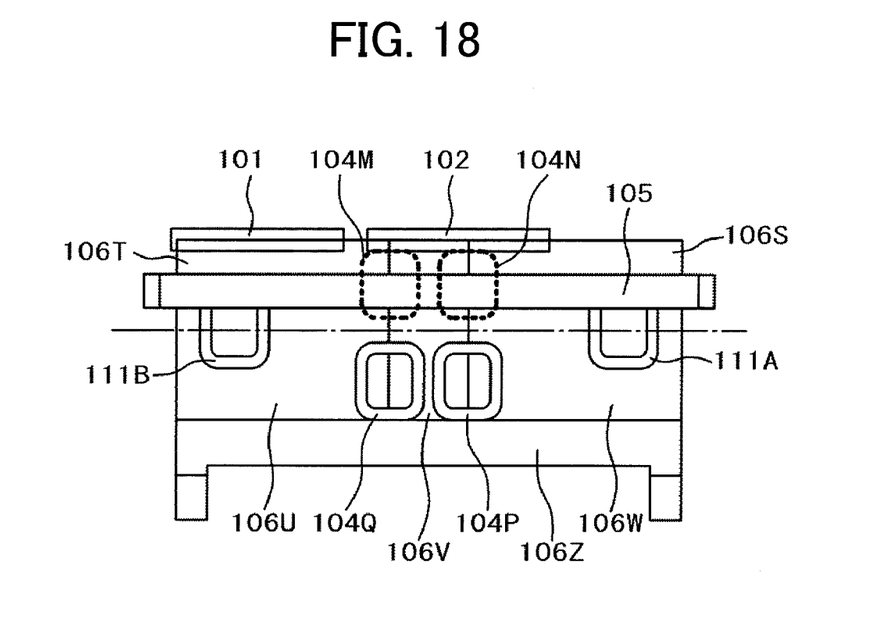
FIG. 18 is a cross sectional view showing the position for each of coils in the Embodiment 3.

FIG. 18 is a cross sectional view showing the position for each of the coils in the Embodiment 3, which is drawn in the same manner as that of FIG. 15 of the Embodiment 2. The dotted broken line in the drawing shows the center of the suspension wires 109B and 109E in view of the height. Further, since tracking coils 104M and 104N shown by broken lines are present on a plane opposite to tracking coils 104P and 104Q, they are not actually present in the cross sectional view. However, they are drawn for the reference so as to recognize the relative position for the height.

Figure 19:
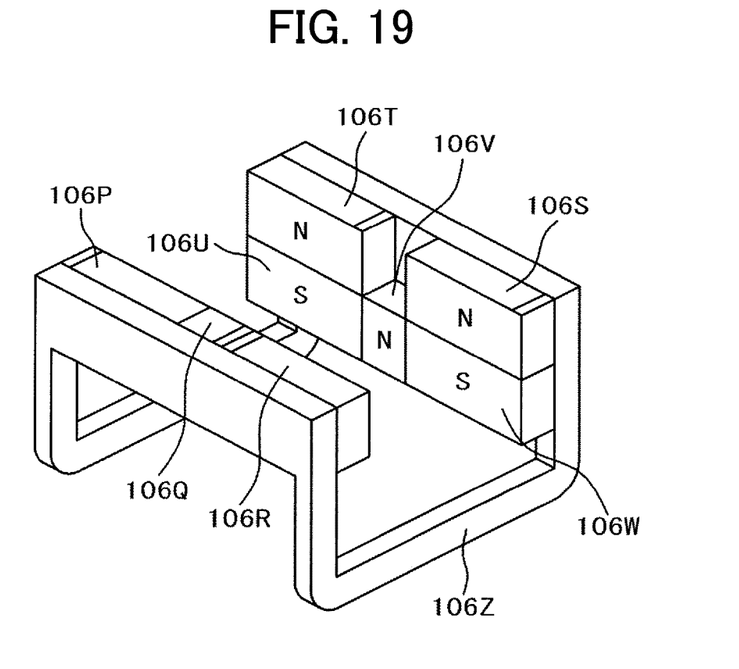
FIG. 19 is an exterior view of a magnet holder in the embodiment 3.
Figure 20:
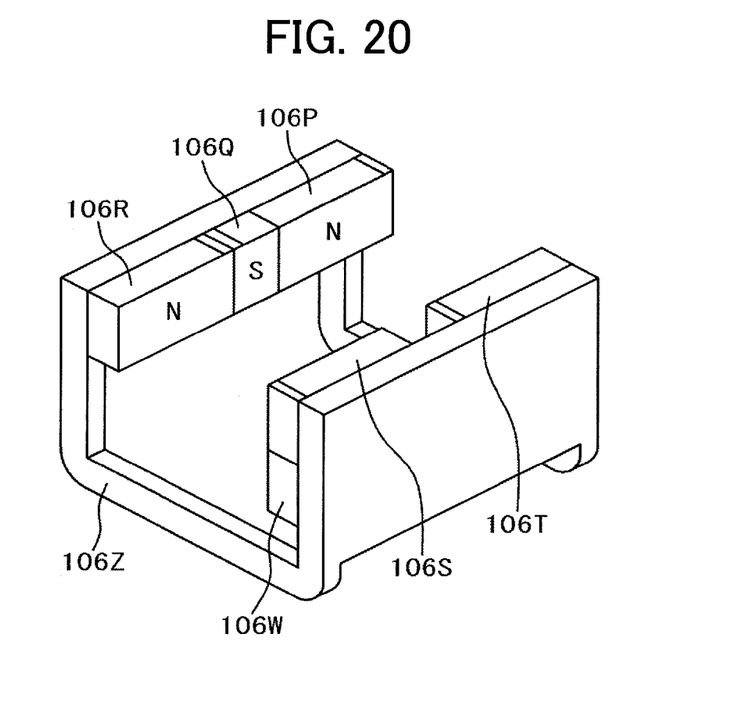
FIG. 20 is another exterior view of the magnet holder in the Embodiment 3.

FIG. 19 is an exterior view of a magnet holder in the Embodiment 3 and FIG. 20 is another exterior view of the magnet holder in the Embodiment 3. Each of the drawings is drawn in the same manner as that of FIG. 12 and FIG. 13 of the Embodiment 2.

That is, while the numbers for the tracking coils and the magnets in the Embodiment 3 are identical with those of the Embodiment 2, their arrangement is different from those of the Embodiment 2. The Embodiment 3 is similar to the Embodiment 1 in that the position the tracking coils 104P and 104Q is different in the height from that of the tracking coils 104M and 104N and they are situated above and below with reference to the suspension wires 109B and 109E interposed therebetween. Accordingly, the suspension wires 109B and 109E may be at the height identical with that in the Embodiment 1. Further, the Embodiment 3 is similar to the Embodiment 2 in that the tilt coil 111A overlaps with the magnets 106S and 106W having different polarities by a substantially identical area and in that the tilt coil 111B overlaps with the magnets 106T and 106U having different polarities by a substantially identical area. The tilt coils 111A and 111B are situated in a substantially symmetrical manner with respect to the height of the suspension wires 109B and 109E. In accordance with the change of the arrangement described above, as shown in FIG. 19 and FIG. 20, the arrangement and the polarity for each of the magnets are different from those of FIG. 12 and FIG. 13. In this embodiment, the magnets 106S and 106T may be saved providing that lowering of the efficiency of the tilt coil results in no substantial problem. In the same manner as in the Embodiment 1, one of the features of the Embodiment 3 is that the tracking coils 104P and 104Q that oppose to the tracking coils 104M and 104N situated above the cavity for the incidence of the laser light and the suspension wires 109B and 109E are situated at the frontal side for the incident laser light and at the back of the total reflection mirror, that is, below the suspension wires 109B and 109E. Further, the tilt coils 111A and 111B are provided substantially in a symmetrical manner with reference to the vertical position of the suspension wires 109B and 109E. Accordingly, the Embodiment 3 can also drastically improve the phenomenon that the secondary resonance is generated by the thrust, to result in a disadvantage in the recording and reproducing operation.

Preferred embodiments described above are only for illustration and do not intend to restrict the invention. While different embodiments may be considered based on the purport of the invention, each of them is within a range of the present invention.

While we have shown and described several embodiments in accordance with our inventions, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claims is:

1. An optical pick-up of an optical disc unit of irradiating a laser light to an optical disc thereby recording and reproducing information signals including;
    a plurality of laser light sources each generating a laser light in the direction of a linear velocity parallel to the disc surface of the optical disc,
    a plurality of total reflection mirrors each irradiated with a laser light generated by each of the plurality of laser light sources and reflecting the light in a direction perpendicular to the disc surface of the optical disc, and
    an objective lens driving device having a plurality of objective lenses each supplied with each of the laser lights reflected by each of the plurality of total reflection mirrors and irradiates the laser light to the optical disc in which
    the objective lens driving device includes:
    a plurality of objective lenses for condensing the laser light to the optical disc,
    first and second tracking coils that supply varying magnetic fields for controlling the radial position of the objective lens to the surface of the optical disc,
    a focusing coil that supplies the varying magnetic fields for controlling the position of the objective lens perpendicular to the surface of the optical disc,
    a lens coil holder in which the plurality of objective lenses are mounted being juxtaposed in the radial direction of the optical disc on the surface opposing to the optical disc, and the first and second tracking coils are mounted on the lateral surface parallel to the radial direction of the optical disc, and having a focusing coil at the periphery thereof,
    first and second magnet groups which are arranged in the radial direction to the optical disc and generate DC magnetic fields for driving the lens coil holder in the radial direction to the surface of the optical disc and in the direction perpendicular to the surface of the optical disc, and
    suspension wires which are provided in the direction of the linear velocity parallel to the surface of the optical disc for supplying control signals to the first and the second tracking coils and the focusing coil thereby generating the varying magnetic fields and supporting the lens coil holder, in which
    the lens coil holder has a cavity extending in the radial direction of the optical disc for irradiating the laser light to the total reflection mirror,
    the first tracking coil is situated on the lateral surface of the lens coil holder above the cavity and the second tracking coil is situated on the lateral surface of the lens coil holder opposite to that of the first tracking coil with reference to the total reflection mirror interposed therebetween, and the first tracking coil and the second tracking coil are situated at different heights with reference to the vertical center of the suspension wires interposed therebetween.

2. An optical pick-up of an optical disc unit of irradiating a laser light to an optical disc thereby recording and reproducing information signals including;
    a plurality of laser light sources each generating a laser light in the direction of a linear velocity parallel to the disc surface of the optical disc,
    a plurality of total reflection mirrors each irradiated with a laser light generated by each of the plurality of laser light sources and reflecting the light in a direction perpendicular to the disc surface of the optical disc, and
    an objective lens driving device having a plurality of objective lenses each supplied with each of the laser lights reflected by each of the plurality of total reflection mirrors and irradiates the laser light to the optical disc in which
    the objective lens driving device includes:
    a plurality of objective lenses for condensing the laser light to the optical disc,
    first and second tracking coils that supply varying magnetic fields for controlling the radial position of the objective lens to the surface of the optical disc,
    a focusing coil that supplies the varying magnetic fields for controlling the position of the objective lens perpendicular to the surface of the optical disc,
    a tilt coil that supplies varying magnetic fields for controlling the tilting direction of the objective lens to the surface of the optical disc,
    a lens coil holder in which the plurality of objective lenses are mounted being juxtaposed in the radial direction of the optical disc on the surface opposing to the optical disc, and the first and second tracking coils are mounted on the lateral surface parallel to the radial direction of the optical disc,
    first and second magnet groups which are arranged in the radial direction of the optical disc and generate DC magnetic fields for driving the lens coil holder in the radial direction to the surface of the optical disc, in the direction perpendicular to the surface of the optical disc, and in the direction tilting to the optical disc, and suspension wires which are provided in the direction of the linear velocity parallel to the surface of the optical disc for supplying control signals to the first and the second tracking coils, the focusing coil, and the tilt coil thereby generating the varying magnetic fields and supporting the lens coil holder, in which the lens coil holder has a cavity extending in the radial direction of the optical disc for irradiating the laser light to the total reflection mirror, and the first tracking coil is situated on the lateral surface of the lens coil holder above the cavity and the second tracking coil is situated on the lateral surface of the lens coil holder opposite to that of the first tracking coil with reference to the total reflection mirror interposed therebetween, the tilt coil is situated on the lateral surface identical with that of the second tracking coil, and most of the portion of the first tracking coil and the second tracking coil are situated at a vertical height with reference to the suspension wires and the tilt coil is situated at the other remaining vertical height with reference to the suspension wires.

3. An optical pick-up of an optical disc unit of irradiating a laser light to an optical disc thereby recording and reproducing information signals including;

a plurality of laser light sources each generating a laser light in the direction of a linear velocity parallel to the disc surface of the optical disc, a plurality of total reflection mirrors each irradiated with a laser light generated by each of the plurality of laser light sources and reflecting the light in a direction perpendicular to the disc surface of the optical disc, and an objective lens driving device having a plurality of objective lenses each supplied with each of the laser lights reflected by each of the plurality of total reflection mirrors and irradiates the laser light to the optical disc in which the objective lens driving device includes:

a plurality of objective lenses for condensing the laser light to the optical disc, first and second tracking coils that supply varying magnetic fields for controlling the radial position of the objective lens to the surface of the optical disc, a focusing coil that supplies the varying magnetic fields for controlling the position of the objective lens perpendicular to the surface of the optical disc, a tilt coil that supplies varying magnetic fields for controlling the tilting direction of the objective lens to the surface of the optical disc, a lens coil holder in which the plurality of objective lenses are mounted being juxtaposed in the radial direction of the optical disc on the surface opposing to the optical disc, and the first and second tracking coils are mounted on the lateral surface parallel to the radial direction of the optical disc, first and second magnet groups which are arranged in the radial direction to the optical disc and generate a DC magnetic field for driving the lens coil holder in the radial direction of the surface of the optical disc, in the perpendicular direction to the surface of the optical disc, and in the direction tilting to the optical disc, and suspension wires which are provided in the direction of the linear velocity parallel to the surface of the optical disc for supplying control signals to the first and the second tracking coils, the focusing coil, and the tilt coil thereby generating the varying magnetic fields and supporting the lens coil holder, in which the lens coil holder has a cavity extending in the radial direction of the optical disc for irradiating the laser light to the total reflection mirror, the first tracking coil is situated on the lateral surface of the lens coil holder above the cavity and the second tracking coil is situated on the lateral surface of the lens coil holder on the side opposite to the first tracking coil with reference to the total reflection mirror interposed therebetween, the tilt coil is situated on the lateral surface identical with that of the second tracking coil, the first tracking coil is situated at a height with reference to the suspension wires, the second tracking coil is situated at the other remaining height with reference to the suspension wires, and the center for the height of the tilt coil is situated at the vertical height of the suspension wire.

4. The optical pick-up according to claim 1, including a magnet holder having the first and the second magnet groups mounted thereon, in which the magnet holder has a cavity extending in the radial direction of the optical disc for irradiating the laser light to the total reflection mirror, the first magnetic group is situated at the lateral surface of the magnet holder above the cavity, and the second magnet group is situated at the lateral surface of the magnet holder on the side opposite to that of the first magnet group with reference the total reflection mirror interposed therebetween.

* * * * *